(12) United States Patent
Pautis et al.

(10) Patent No.: US 12,337,978 B2
(45) Date of Patent: Jun. 24, 2025

(54) ASSEMBLY FOR AN AIRCRAFT COMPRISING A WING AND AN ENGINE PYLON FOR COUPLING A PROPULSION SYSTEM TO SAID WING

(71) Applicant: Airbus Operations SAS, Toulouse (FR)

(72) Inventors: Olivier Pautis, Toulouse (FR); Michael Berjot, Toulouse (FR); Pierre-Antoine Combes, Toulouse (FR); Paul-Adrien Taveau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/502,248

(22) Filed: Nov. 6, 2023

(65) Prior Publication Data

US 2024/0150028 A1 May 9, 2024

(30) Foreign Application Priority Data

Nov. 8, 2022 (FR) ...................................... 2211634

(51) Int. Cl.
*B64D 27/26* (2006.01)
*B64D 27/40* (2024.01)

(52) U.S. Cl.
CPC ............ *B64D 27/40* (2024.01); *B64D 27/402* (2024.01)

(58) Field of Classification Search
CPC ...... B64D 27/40; B64D 27/402; B64D 27/12; B64D 27/18; B64D 27/408; B64C 3/32
See application file for complete search history.

(56) References Cited

U.S. PATENT DOCUMENTS

| 4,560,122 A | 12/1985 | Parkinson et al. | |
| 6,474,597 B1 * | 11/2002 | Cazenave | B64D 27/18 |
| | | | 244/54 |
| 7,789,344 B2 | 9/2010 | Cousin et al. | |
| 8,205,825 B2 * | 6/2012 | Huggins | B64D 27/40 |
| | | | 244/54 |
| 9,238,511 B2 | 1/2016 | Woolley et al. | |
| 9,889,942 B2 | 2/2018 | Pautis et al. | |
| 10,358,226 B2 | 7/2019 | Pautis | |
| 10,583,930 B2 * | 3/2020 | West | B64C 3/32 |
| 11,702,216 B2 * | 7/2023 | Berjot | B64D 27/406 |
| | | | 244/54 |

(Continued)

FOREIGN PATENT DOCUMENTS

EP      0115914 A1      8/1984

OTHER PUBLICATIONS

French Search Report for corresponding French Patent Application No. 2211634 dated Apr. 27, 2023; priority document.

*Primary Examiner* — Medhat Badawi
*Assistant Examiner* — Vicente Rodriguez
(74) *Attorney, Agent, or Firm* — Greer, Burns & Crain, Ltd.

(57) ABSTRACT

An assembly including a wing with a pressure-side panel and a suction-side panel through which two bores pass, an engine pylon including a blade with three bores and two fastening lugs, each of which has a sixth bore, two first shackles fastened between the blade and the suction-side panel, two second shackles fastened between the blade and the suction-side panel and two fittings, which are fastened beneath the pressure-side panel and each have a female clevis for housing a fastening lug therein.

3 Claims, 3 Drawing Sheets

(56) References Cited

U.S. PATENT DOCUMENTS

| | | | |
|---|---|---|---|
| 2005/0082423 A1* | 4/2005 | Whitmer | B64D 27/40 244/54 |
| 2015/0251768 A1* | 9/2015 | Woolley | B64D 27/12 244/54 |
| 2016/0221682 A1 | 8/2016 | Pautis et al. | |
| 2017/0088278 A1 | 3/2017 | Da Silva et al. | |
| 2021/0101689 A1 | 4/2021 | Blanc et al. | |
| 2022/0017229 A1 | 1/2022 | Gueneau et al. | |

* cited by examiner

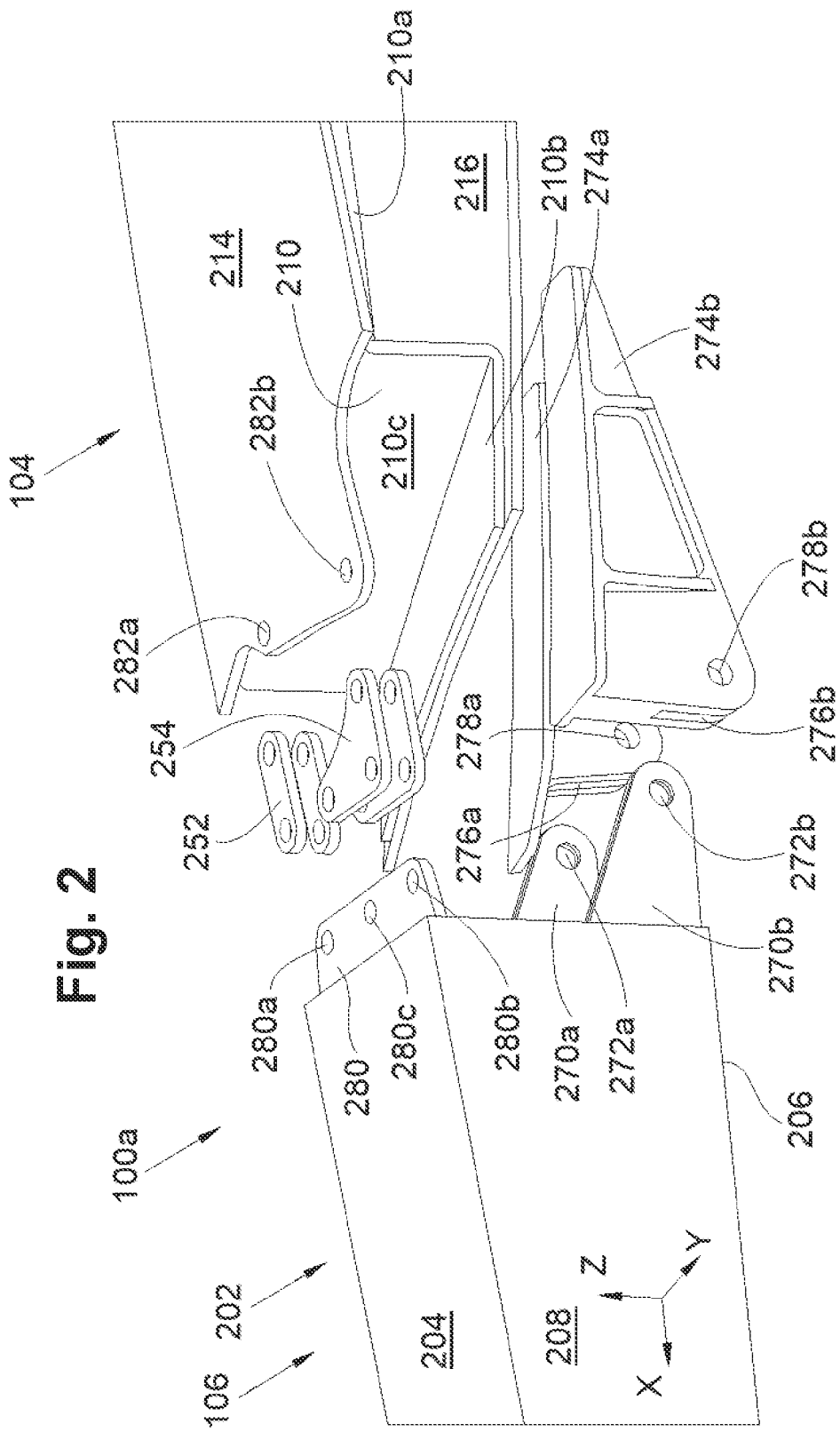

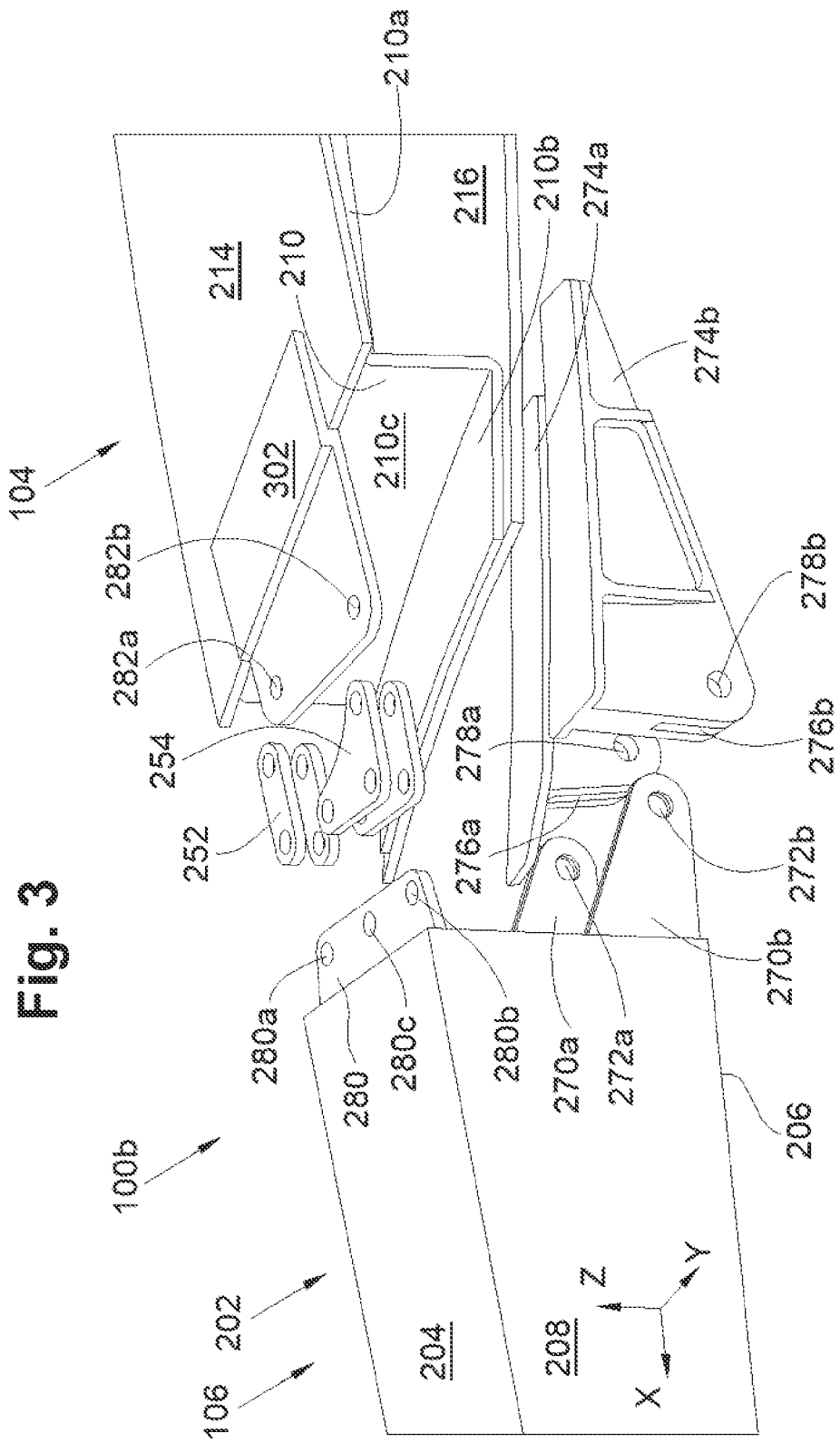

ASSEMBLY FOR AN AIRCRAFT COMPRISING A WING AND AN ENGINE PYLON FOR COUPLING A PROPULSION SYSTEM TO SAID WING

CROSS-REFERENCES TO RELATED APPLICATIONS

This application claims the benefit of the French patent application No. 2211634 filed on Nov. 8, 2022, the entire disclosures of which are incorporated herein by way of reference.

FIELD OF THE INVENTION

The present invention relates to an assembly for an aircraft, which comprises a wing and an engine pylon for coupling a propulsion system to the wing, and also to an aircraft comprising a propulsion system and such an assembly for coupling the propulsion system to the wing.

BACKGROUND OF THE INVENTION

Typically, for an aircraft, a propulsion assembly comprises, for example, a turbojet engine, which is fastened to a wing of the aircraft by means of an engine pylon. The engine pylon is generally made up of a primary structure formed by a box made up of an upper spar, a lower spar, two lateral panels connecting the two spars, and internal ribs distributed along the box.

The turbojet engine is fastened beneath the engine pylon using engine attachment means that conventionally comprise, at the front, a front engine attachment, at the rear, a rear engine attachment, and, between the front and rear engine attachments, a thrust-force-reacting assembly comprising reaction link rods fastened between the turbojet engine and the primary structure of the pylon in order to absorb the thrust loads generated by the turbojet engine.

The engine pylon is furthermore fastened to the structure of the wing by means of fittings through which the forces from the turbojet engine travel towards the structure of the wing. Although current installations are satisfactory, a configuration needs to be provided in which force transfer is improved, in particular in the case in which the engine is installed in close vertical proximity to the wing.

SUMMARY OF THE INVENTION

One aim of the present invention is to propose an assembly for an aircraft comprising a wing and an engine pylon for coupling a propulsion system to the wing and that comprises means for fastening to the wing that ensure an improved transfer of forces towards the structure of the wing while at the same time allowing the engine to be installed in close vertical proximity to the wing.

To this end, what is proposed is an assembly for mounting a propulsion system having a vertical median plane on an aircraft, the assembly comprising:
- a wing with a front spar, a suction-side panel and a pressure-side panel, which are fastened at the upper portion of the front spar and at the lower portion of the front spar, respectively, wherein a fourth bore and a fifth bore pass vertically through the suction-side panel,
- an engine pylon comprising a primary structure, a blade, which is secured to the primary structure and extends to the rear and in the upper portion of the primary structure, and two starboard-side and port-side fastening lugs, which are secured to the primary structure and extend to the rear and along the sides of the primary structure, wherein a first bore, a second bore and a third bore pass vertically through the blade, wherein a sixth bore passes horizontally through each fastening lug,
- two first shackles arranged vertically on either side of the blade and of the suction-side panel, wherein a first bore in each first shackle is aligned so as to be coaxial with the first bore in the blade, with a pin being inserted into the bores aligned in this way, wherein a second bore in each first shackle is aligned so as to be coaxial with the fourth bore in the suction-side panel, with a pin being inserted into the bores aligned in this way,
- two second shackles arranged vertically on either side of the blade and of the suction-side panel, wherein a first bore in each second shackle is aligned so as to be coaxial with the second bore in the blade, with a pin being inserted into the bores aligned in this way, wherein a second bore in each second shackle is aligned so as to be coaxial with the third bore in the blade, with a pin being inserted into the bores aligned in this way, wherein a third bore in each second shackle is aligned so as to be coaxial with the fifth bore in the suction-side panel, with a pin being inserted into the bores aligned in this way, and
- a starboard-side fitting and a port-side fitting, which are fastened beneath the pressure-side panel and have, respectively, a starboard-side female clevis in which the starboard-side fastening lug is inserted and a port-side female clevis in which the port-side fastening lug is inserted, wherein a seventh bore passes through each female clevis, the axis of the seventh bore being coaxial with the axis of the sixth bore in the fastening lug inserted therein, and wherein a pin is inserted into the associated bores aligned in this way.

With such an engine pylon, the forces from the engine that are transported by the primary structure of the pylon are transmitted directly to the suction-side and pressure-side panels.

Advantageously, the suction-side panel comprises a plate that is secured to the suction-side panel and the two bores in the suction-side panel are formed in the plate.

The invention also proposes an aircraft comprising a propulsion system and an assembly according to one of the preceding variants, wherein the propulsion system is fastened to the engine pylon.

BRIEF DESCRIPTION OF THE DRAWINGS

The abovementioned features of the invention, along with others, will become more clearly apparent upon reading the following description of one exemplary embodiment, the description being given with reference to the appended drawings, in which:

FIG. 2 is an exploded perspective view of an assembly according to a first embodiment of the invention, and FIG. 3 is an exploded perspective view of an assembly according to a second embodiment of the invention.

DETAILED DESCRIPTION OF THE PREFERRED EMBODIMENTS

Figure 1:
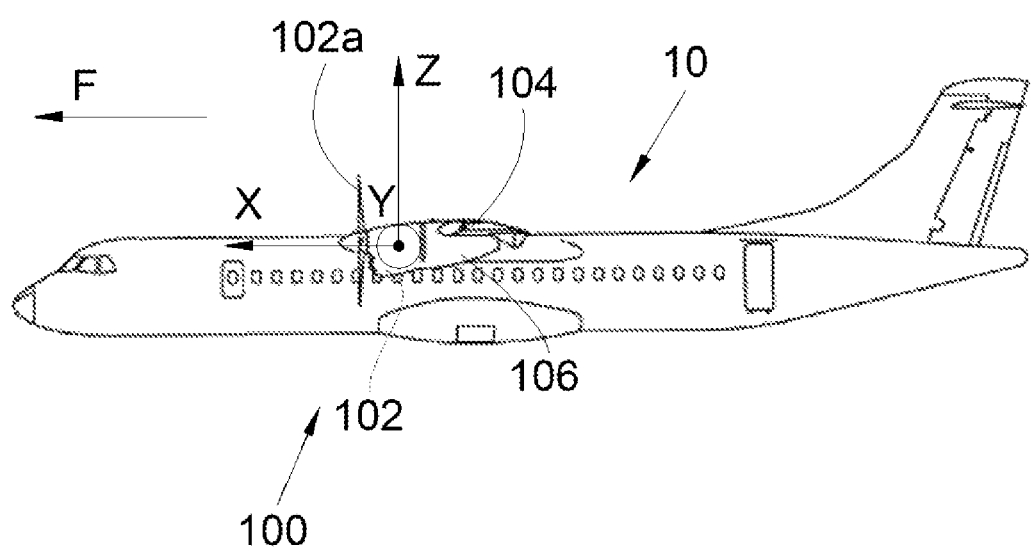
FIG. 1 is a side view of an aircraft according to the invention.

FIG. 1 shows an aircraft 10 comprising a propulsion system 102, for example of the turbojet or turboprop engine type. The propulsion system 102 is connected to a wing 104 of the aircraft 10 by way of an engine pylon 106. The wing 104 and the engine pylon 106 form an assembly 100 according to the invention, and the propulsion system 102 is fastened to the engine pylon 106 using any suitable fastening means known to a person skilled in the art, such as those disclosed in document US-A-2016/0221682.

In the following description, terms relating to a position are considered in relation to an aircraft in a normal flight position, i.e. as shown in FIG. 1, and the positions "front" and "rear" are considered with respect to the front and rear of the propulsion system 102 and with respect to the direction of forward travel F of the aircraft 10 when the propulsion system 102 is operational.

In the following description, and by convention, X denotes the longitudinal direction, which is horizontal when the aircraft is on the ground, of the propulsion system, Y denotes the transverse direction, which is horizontal when the aircraft is on the ground, and Z denotes the vertical direction, which is vertical when the aircraft is on the ground, these three directions X, Y and Z being mutually orthogonal.

The engine pylon 106 and the propulsion system 102 have a vertical median plane XZ and the propulsion system 102 is in this case a turboprop engine with a propeller 102a, but it could be of the turbofan engine type with a nacelle.

FIG. 2 shows the assembly 100a according to a first embodiment of the invention and FIG. 3 shows the assembly 100b according to a second embodiment of the invention. Elements that are common to both embodiments bear the same reference signs.

The engine pylon 106 comprises a rigid structure, which forms a box and is also referred to as primary structure 202. The primary structure 202 is formed by an upper spar 204, a lower spar 206 and two starboard-side and port-side lateral panels 208 (only the port-side panel is shown in FIGS. 1 and 2) connecting the two spars 204 and 206.

The structure of the wing 104 comprises a front spar 210, a suction-side panel 214 and a pressure-side panel 216, both of which are fastened to the front spar 210 and generally extend within horizontal planes XY.

Of course, in order to ensure the rigidity of the wing, its structure comprises other elements, such as ribs that are distributed between the suction-side panel 214 and the pressure-side panel 216.

In this case, the front spar 210 takes the form of a profile in the form of a reverse Z-shaped step in FIG. 2, with an upper wing 210a and a lower wing 210b, which are generally horizontal, and a central portion 210c, which is generally perpendicular to the median plane and extends vertically within the plane YZ. The suction-side panel 214 is fastened above the upper wing 210a of the spar 210 and the pressure-side panel 216 is fastened beneath the lower wing 210b of the spar 210. The front spar 210 is fastened to the panels 214 and 216 using any suitable means, such as, for example, welds, bolts, etc. The suction-side panel 214 is thus fastened at the upper portion of the front spar 210 and the pressure-side panel 216 is fastened at the lower portion of the front spar 210.

The central portion 210c is situated at the leading edge of the wing 104.

The fastening of the engine pylon 106 to the wing 104 differs slightly between the first embodiment and the second embodiment.

The engine pylon 106 comprises, at the rear, a blade 280, which is secured to the primary structure 202 and extends to the rear of the primary structure 202 in the continuation of the upper spar 204. The blade 280 thus extends generally horizontally in parallel with the plane XY. Three bores 280a-c pass through the blade 280 and the axis of each bore 280a-c in the blade 280 is generally vertical. There is thus a first, in this case starboard-side, bore 280a, a second, in this case port-side, bore 280b and a third, in this case central, bore 280c. The third bore 280c is generally in the median plane and the first bore 280a and the second bore 280b are on either side of the median plane. The blade 280 thus extends in the upper portion of the primary structure 202 towards the front spar 210 of the wing structure 104 and faces the suction-side panel 214.

In the first embodiment of the invention, two bores 282a-b pass through the suction-side panel 214 and the axis of each bore 282a-b in the suction-side panel 214 is parallel with the axes of the bores 280a-c in the blade 280 and is therefore generally vertical. There is a fourth, in this case starboard-side, bore 282a and a fifth, in this case port-side, bore 282b.

In the second embodiment of the invention, the suction-side panel 214 comprises a plate 302, which is secured to the suction-side panel 214, extends towards the front and through which the two bores 282a-b in the suction-side panel 214 pass. The plate 302 thus extends towards the front from the front end of the suction-side panel 214 into the region of the leading edge of the wing 104.

The bores 282a-b in the suction-side panel 214 are on either side of the median plane and are aligned with the first bore 280a and the second bore 280b, respectively, in parallel with the longitudinal direction X.

The assembly 100a-b comprises a first, in this case starboard-side, set of shackles 252 and a second, in this case port-side, set of shackles 254, and each set of shackles 252, 254 is made up of two identical shackles that are vertically superposed. In the embodiment of the invention presented herein, the shackles 252 of the first set have two fastening points and the shackles 254 of the second set have three fastening points, but in another embodiment that has not been shown, the shackles 252 with two points and the shackles 254 with three points may be swapped from starboard side to port side and vice versa.

One of the sets of shackles 252, 254, in this case the first set of shackles 252, is made up of two first shackles 252, each comprising two bores. The two first shackles 252 are arranged vertically on either side of the blade 280, wherein a first bore in each first shackle 252 is aligned so as to be coaxial with the first bore 280a in the blade 280. A pin is inserted into the first bore in each first shackle 252 and the first bore 280a in the blade 280 in order to form a connection point in the form of a pivot connection that pivots about a generally vertical axis.

The two first shackles 252 are arranged vertically on either side of the suction-side panel 214, wherein a second bore in each first shackle 252 is aligned so as to be coaxial with the fourth bore 282a in the suction-side panel 214. A pin is inserted into the second bore in each first shackle 252 and the fourth bore 282a in the suction-side panel 214 in order to form a connection point in the form of a pivot connection that pivots about a generally vertical axis.

The other of the sets of shackles 252, 254, in this case the second set of shackles 254, is made up of two second shackles 254, each comprising three bores. The two second shackles 254 are arranged vertically on either side of the blade 280, wherein a first bore in each second shackle 254 is aligned so as to be coaxial with the second bore 280b in the blade 280 and wherein a second bore in each second shackle 254 is aligned so as to be coaxial with the third bore 280c in the blade 280. A pin is inserted into the first bore in each second shackle 254 and the second bore 280b in the blade 280 in order to form a connection point in the form of a pivot connection that pivots about a generally vertical axis. A pin is inserted into the second bore in each second shackle 254 and the third bore 280c in the blade 280 in order to form a connection point in the form of a pivot connection that pivots about a generally vertical axis.

The two second shackles 254 are arranged vertically on either side of the suction-side panel 214, wherein a third bore in each second shackle 254 is aligned so as to be coaxial with the fifth bore 282b in the suction-side panel 214. A pin is inserted into the third bore in each second shackle 254 and the fifth bore 282b in the suction-side panel 214 in order to form a connection point in the form of a pivot connection that pivots about a generally vertical axis.

The engine pylon 106 comprises, at the rear of the primary structure 202, two starboard-side 270a and port-side 270b fastening lugs, which are secured to the primary structure 202 and extend to the rear of the primary structure 202 in the continuation of the starboard-side lateral panel and of the port-side lateral panel 208, respectively. The fastening lugs 270a-b thus extend along the starboard and port sides of the primary structure 202 towards the front spar 210.

Each fastening lug 270a-b thus extends generally within a vertical plane that is parallel with the plane XZ and the lugs are on either side of the median plane. A sixth bore 272a-b passes through each fastening lug 270a-b, on the starboard side and port side, respectively, and the axis of each sixth bore 272a-b is generally horizontal. There is thus a starboard-side sixth bore 272a and a port-side sixth bore 272b, which are coaxial.

The assembly 100a-b also comprises two fittings 274a-b, namely a starboard-side fitting 274a and a port-side fitting 274b, which are arranged on either side of the median plane and are each fastened beneath the pressure-side panel 216 using any suitable means, such as welds, bolts, etc.

Each fitting 274a-b has a female clevis 276a-b, namely a starboard-side female clevis 276a in which the starboard-side fastening lug 270a is inserted and a port-side female clevis 276b in which the port-side fastening lug 270b is inserted.

A seventh bore 278a-b passes through each female clevis 276a-b, the axis of the seventh bore being coaxial with the axis of the sixth bore 272a-b in the fastening lug 270a-b inserted therein, i.e., being generally horizontal.

The connection between a fitting 274a-b and the associated fastening lug 270a-b is provided by installing a pin that is inserted into the associated bores, i.e., those in the female clevis 276a-b and in the fastening lug 270a-b, and takes the form of a pivot connection that pivots about a generally horizontal axis.

The forces from the propulsion system 102 thus travel through the engine pylon 106 and then directly into the suction-side 214 and pressure-side 216 panels. Furthermore, the rear portion of the engine pylon 106 thus faces the front spar 210, the entire height of which is used to reduce the forces caused by reacting the moments, in particular MY and MZ.

The longitudinal forces (Tx) are distributed through:
the two starboard-side shackles 252,
the two port-side shackles 254 through the second bore 280b in the blade 280 and the fifth bore 282b in the suction-side panel 214, and
the connections between the female devises 276a-b and the fastening lugs 270a-b.

The transverse forces (Ty) are transmitted through the two port-side shackles 254.

The vertical forces (Tz) are transmitted through the connections between the female devises 276a-b and the fastening lugs 270a-b.

The torsional moment Mx about the longitudinal direction X is compensated for at the connections between the female devises 276a-b and the fastening lugs 270a-b.

The bending moment My about the transverse direction Y and the bending moment Mz about the vertical direction Z are compensated for at the connections between the female devises 276a-b and the fastening lugs 270a-b and at the sets of shackles 252 and 254 arranged on either side of the vertical median plane, on the starboard side and on the port side.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for mounting a propulsion system having a vertical median plane on an aircraft, said assembly comprising:
a wing with a front spar, a suction-side panel and a pressure-side panel, which are fastened at an upper portion of the front spar and at a lower portion of the front spar, respectively, wherein a fourth bore and a fifth bore pass vertically through the suction-side panel,
an engine pylon comprising a primary structure, a blade, which is secured to the primary structure and extends to the rear and in an upper portion of the primary structure, and two starboard-side and port-side fastening lugs, which are secured to the primary structure and extend to the rear and along sides of the primary structure, wherein a first bore, a second bore and a third bore pass vertically through the blade, wherein a sixth bore passes horizontally through each fastening lug,
two first shackles arranged vertically on either side of the blade and of the suction-side panel, wherein a first bore in each first shackle is aligned so as to be coaxial with the first bore in the blade, with a pin inserted into the two first bores, wherein a second bore in each first shackle is aligned so as to be coaxial with the fourth bore in the suction-side panel, with a pin inserted into the second and fourth bores,
two second shackles arranged vertically on either side of the blade and of the suction-side panel, wherein a first bore in each second shackle is aligned so as to be coaxial with the second bore in the blade, with a pin inserted into the first and second bores, wherein a second bore in each second shackle is aligned so as to be coaxial with the third bore in the blade, with a pin inserted into the second and third bores, wherein a third bore in each second shackle is aligned so as to be coaxial with the fifth bore in the suction-side panel, with a pin inserted into the third and fifth bores, and a starboard-side fitting and a port-side fitting, which are fastened beneath the pressure-side panel and have, respectively, a starboard-side female clevis in which the starboard-side fastening lug is inserted and a port-side female clevis in which the port-side fastening lug is inserted, wherein a seventh bore passes through each female clevis, an axis of said seventh bore coaxial with an axis of the sixth bore in the fastening lug inserted therein, and wherein a pin is inserted into the seventh and sixth bores.

2. The assembly according to claim 1, wherein the suction-side panel comprises a plate that is secured to the suction-side panel and wherein the fourth and fifth bores in the suction-side panel are formed in said plate.

3. An aircraft comprising:
a propulsion system and
the assembly according to claim 1, wherein the propulsion system is fastened to the engine pylon.

* * * * *